S. H. WIESEDEPPE.
Animal-Trap.

No. 210,071. Patented Nov. 19, 1878.

WITNESSES

INVENTOR:
S. H. Wiesedeppe
BY
ATTORNEYS.

UNITED STATES PATENT OFFICE.

SIMON H. WIESEDEPPE, OF SENECA, KANSAS.

IMPROVEMENT IN ANIMAL-TRAPS.

Specification forming part of Letters Patent No. 210,071, dated November 19, 1878; application filed July 24, 1878.

*To all whom it may concern:*

Figure 1:
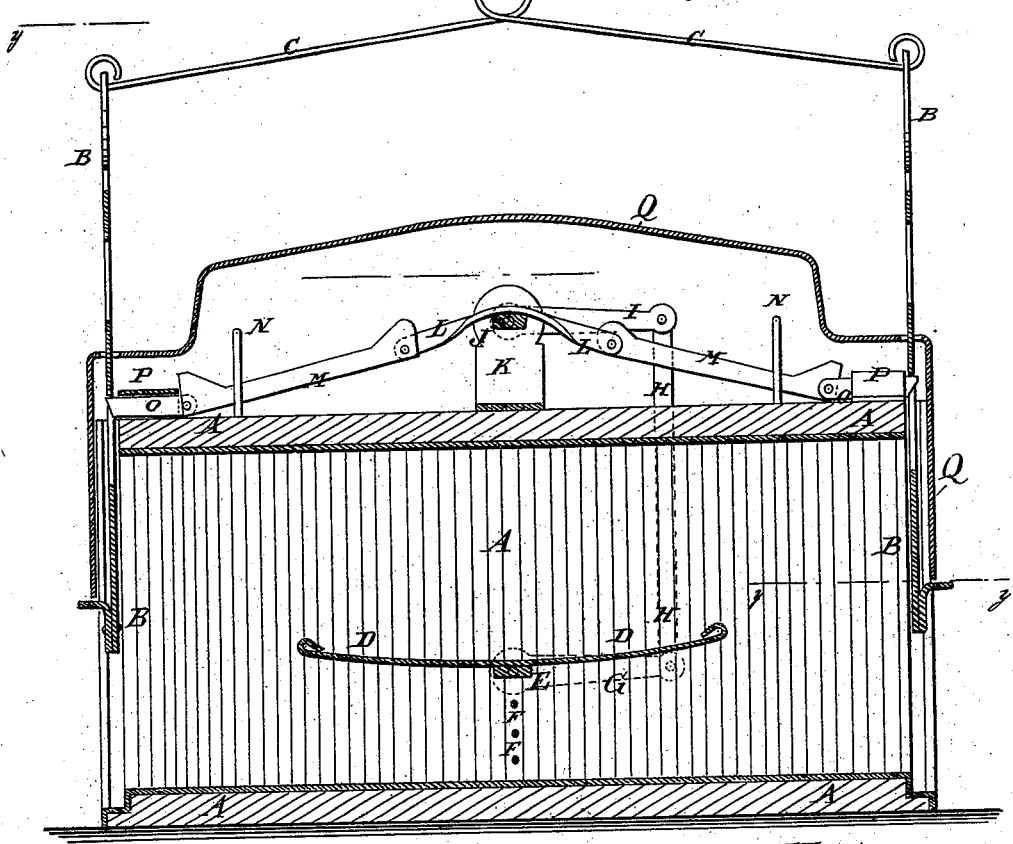
Figure 2:
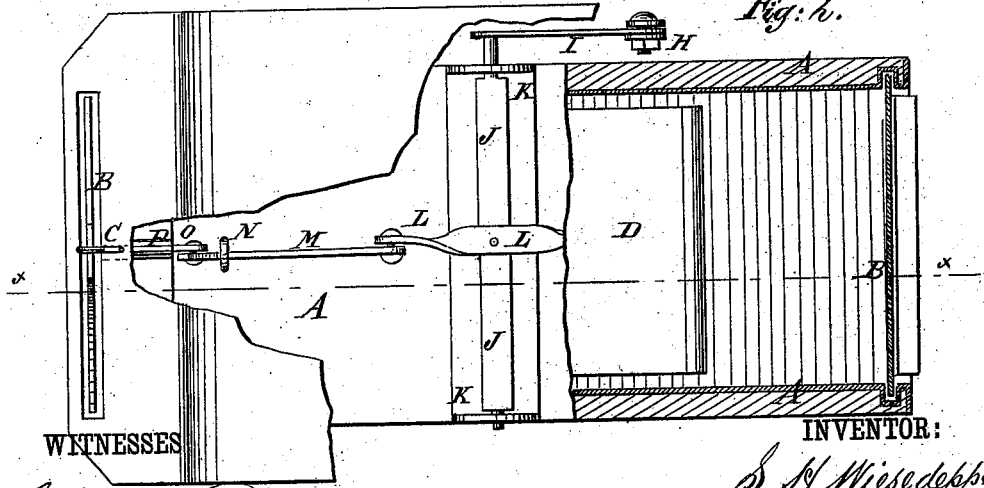

Be it known that I, SIMON H. WIESEDEPPE, of Seneca, in the county of Nemaha and State of Kansas, have invented a new and useful Improvement in Animal-Traps, of which the following is a specification:

Figure 1 is a vertical longitudinal section of my improved trap, taken through the line $x\,x$, Fig. 2. Fig. 2 is a top view of the same, part being broken away, and partly in horizontal section, through the line $y\,y$, Fig. 1.

Similar letters of reference indicate corresponding parts.

The object of this invention is to furnish an improved animal-trap, which shall be simple in construction, inexpensive in manufacture, and reliable in use, catching the animal and holding him securely without hurting him, and without alarming other animals that may be near.

The invention consists in the combination, in an animal trap, of the platform and shaft, the crank-arms and connecting-rod, the shaft and equal-armed lever, and the connecting-bars and sliding bolts with each other and with the box and the sliding doors, as hereinafter fully described.

A is a rectangular box, about three feet long, six inches wide, and eight inches deep, or of any other desired or convenient size. The box A is made with open ends, and with closed top, bottom, and sides, and is made of or lined with some material that the caught animal cannot gnaw, and thus eat his way out.

The open ends of the box A are closed by doors B, the side edges of which slide in grooves in the inner sides of the ends of the sides of the box A, and their lower ends shut down into rabbets in the ends of the bottom of the said box A. To the upper ends of the sliding doors B are pivoted the ends of a rod or bar, C, upon the center of which is formed or to it is attached a loop or handle, so that both doors B can be raised at the same time to set the trap.

In the lower middle part of the box A is placed a platform, D, which is attached at its center to a bar or shaft, E. The journals of the shaft E work in bearings secured in holes in the sides of the box A.

The space between the shaft E and the bottom of the box A is closed by cross-wires F, wire-netting, wire-gauze, or other suitable material, to prevent the animal from passing through the box A below the platform D. The space above the platform D is left unobstructed, so that the animal can see a free passage-way through the box A from end to end.

One of the journals of the shaft E projects beyond the bearing or support of said shaft, and to it is rigidly attached the end of the crank-arm G. The arm G projects parallel with the platform D, and to its outer end is pivoted the lower end of the connecting-rod H, which passes up along the side of the box A, and its upper end is pivoted to the outer end of a crank-arm, I. The inner end of the crank-arm I is rigidly attached to the projecting end of the shaft J, which works in brackets or standards K, attached to the middle side parts of the top of the box A.

To the middle part of the shaft J is rigidly attached the center of the lever L, to the ends of which are pivoted the inner ends of the connecting-rods M. The connecting-rods M pass through long staples or guides N, attached to the top of the box A.

To the ends of the connecting-bars M are pivoted the inner ends of the bolts O, which slide in keepers P, attached to the end parts of the top of the box A.

The connecting-bars M are made of such a length that when the equal-armed lever L is turned into a horizontal position the bolts O may be projected to enter holes in the doors B, as shown in Fig. 1.

The trap is set by raising the two doors B, and turning the platform D, the crank-arms G I, and the lever L, which four parts are parallel with each other, into a horizontal position. This movement projects the bolts O into holes in the lower parts of the said doors B. With this construction, when an animal enters the trap and steps upon the platform D, he tilts the said platform by his weight, which movement withdraws the bolts O from the doors B, and allows the said doors to drop, and the animal is caught.

Holes are formed in the upper part of the doors B to receive the ends of the bolts O when the said doors are closed, so that the operating mechanism may play freely as the animal passes back and forth from one end of the box A to the other.

The operating mechanism upon the top of the box A may be covered and protected from accidental injury by a plate or cover, Q, the end parts of which may be bent downward, overlap, and be secured to the upper parts of the ends of the side boards of the box A, to support the doors B against outward pressure, and to serve as a stop for a flange or projection formed upon or attached to the lower parts of the said doors B to strike against, to prevent the doors from being raised out of place, the said doors moving up and down through cross-slots in the said plate or cover at its angles.

Having thus described my invention, I claim as new and desire to secure by Letters Patent—

In an animal-trap, the combination of the platform and shaft D E, the crank-arms and connecting-rod G I H, the shaft and equal-armed lever J L, and the connecting-bars and sliding bolts M O with each other and with the box A and the sliding doors B, substantially as herein shown and described.

SIMON HERMAN WIESEDEPPE.

Witnesses:
   J. H. JOHNSTON,
   T. W. JOHNSTON.